United States Patent [19]

Hashimoto et al.

[11] Patent Number: 4,820,005

[45] Date of Patent: Apr. 11, 1989

[54] METHOD OF FIXING A POLYGON MIRROR AND AN OPTICAL DEFLECTOR HAVING SUCH POLYGON MIRROR

[75] Inventors: Yoshio Hashimoto, Tokyo; Hiroki Tajima, Natori, both of Japan

[73] Assignees: Ricoh Company, Ltd., Tokyo; Tohoku Ricoh Co., Ltd., Shibata, both of Japan

[21] Appl. No.: 135,267

[22] Filed: Dec. 21, 1987

[30] Foreign Application Priority Data

Dec. 27, 1986 [JP] Japan .................................. 61-315417

[51] Int. Cl.$^4$ ............................................ G02B 26/10
[52] U.S. Cl. ........................................ 350/6.8; 350/616
[58] Field of Search .................. 350/6.5, 6.6, 6.7, 6.8, 350/616

[56] References Cited

U.S. PATENT DOCUMENTS

| 3,529,884 | 9/1970 | Ives et al. | 350/6.8 |
| 4,043,632 | 8/1977 | Jeffery et al. | 350/6.8 |

FOREIGN PATENT DOCUMENTS

| 58-136014 | 8/1983 | Japan | 350/6.8 |
| 61-133920 | 6/1986 | Japan . | |
| 62-9313 | 1/1987 | Japan . | |

Primary Examiner—John K. Corbin
Assistant Examiner—Loha Ben
Attorney, Agent, or Firm—Oblon, Fisher, Spivak, McClelland & Maier

[57] ABSTRACT

An optical deflector comprising a rotational shaft, a polygonal mirror, and means for fixing said mirror to said rotational shaft at positions equiangularly spaced with each other around a center of rotation of said mirror, each of said positions opposing to a corner portion of said mirror disposed between reflective surfaces of said mirror adjacent to each other.

6 Claims, 3 Drawing Sheets

METHOD OF FIXING A POLYGON MIRROR AND AN OPTICAL DEFLECTOR HAVING SUCH POLYGON MIRROR

This invention relates to a high-speed optical deflector using a polygonal mirror, and particularly to a method of fixing a polygonal mirror of an optical writing system in a laser printer, a digital copying machine, a facsimile, etc., and to an optical deflector having such polygonal mirror.

A conventional polygonal mirror is fixed to a rotational shaft of an optical deflector at positions opposing to a midportion of every other one of the reflective surfaces of the mirror.

However, in the conventional polygonal mirror, the jitter characteristic of the optical deflector is not so good during high-speed rotation of the mirror.

It is an object of this invention to provide a method of fixing a polygonal mirror to provide a good jitter characteristic of the deflector even during high-speed rotation of the mirror.

According to this invention, the above object is achieved by a method of fixing a polygonal mirror comprising a step of fixing said mirror to a rotational shaft of an optical deflector at positions equiangularly spaced with each other around a center of rotation of said mirror, each of said positions opposing to a corner portion of said mirror disposed between reflective surfaces of said mirror adjacent to each other.

According to this invention, there is provided a method of fixing a polygonal mirror to improve the jitter characteristic of an optical deflector even during high-speed rotation of the mirror.

The fixing step according to the method of this invention is preferably performed at positions being identical in number with the reflective surfaces, or being half in number of the reflective surfaces.

The fixing step according to the method of this invention is preferably performed using a screw.

If the polygonal mirror is composed of an odd number of reflective surfaces, the fixing step is performed at the same number of positions as the reflective surfaces because the positions, at each of which the fixing is performed, must be spaced at equiangularly pitches.

According to this invention, the above object is achieved by an optical deflector comprising a rotational shaft, a polygonal mirror, and means for fixing said mirror to said rotational shaft at positions equiangularly spaced with each other around a center of rotation of said mirror, each of said positions opposing to a corner portion of said mirror disposed between reflective surfaces of said mirror adjacent to each other.

According to the deflector of this invention, there is provided an optical deflector which has a good jitter characteristic even during high-speed rotation of the polygonal mirror.

The fixing means according to the deflector of this invention are preferably disposed at positions being identical in number with the reflective surfaces, or being half in number of the reflective surfaces.

The fixing means according to the deflector of this invention preferably comprises a screw.

The number of the reflective surfaces according to the deflector of this invention may be an even number or an odd number.

According to this invention, the above object is achieved by another method of fixing a polygonal mirror comprising a step of fixing said mirror to a rotational shaft of an optical deflector at positions equiangularly spaced with each other around a center of rotation of said mirror, said positions being identical in number with reflective surfaces of said mirror.

According to this invention, there is provided another method of fixing a polygonal mirror to improve the jitter characteristic of the mirror even during high-speed rotation of the mirror and facilitate the selection of the positions at which the polygonal mirror is fixed.

The fixing step according to another method of this invention is performed at positions each opposing to a midportion of each of reflective surfaces of the mirror or at positions each opposing to a point between a corner portion of the mirror and a midportion of each of the reflective surfaces, the corner portion disposed between the reflective surfaces adjacent to each other.

The fixing step according to another method of this invention is preferably performed using a screw.

According to this invention, the above object is achieved by another optical deflector comprising a rotational shaft, a polygonal mirror and means for fixing said mirror to said rotational shaft at positions equiangularly spaced with each other around a center of rotation of said mirror, said positions being identical in number with reflective surfaces of said mirror.

According to this invention, there is provided another optical deflector which improves its jitter characteristic even during high-speed rotation of the polygonal mirror and which facilitates the selection of the positions at which the polygonal mirror is fixed.

The fixing means according to another deflector of this invention are preferably disposed at positions each opposing to a midportion of each of the reflective surfaces, or at positions each opposing to a point between a corner portion and a midportion of each of the reflective surfaces, the corner portion disposed between the reflective surfaces adjacent to each other.

The fixing means according to another deflector of this invention preferably comprises a screw.

The number of the reflective surfaces according to another deflector of this invention may be an even number or an odd number.

Figure 5:
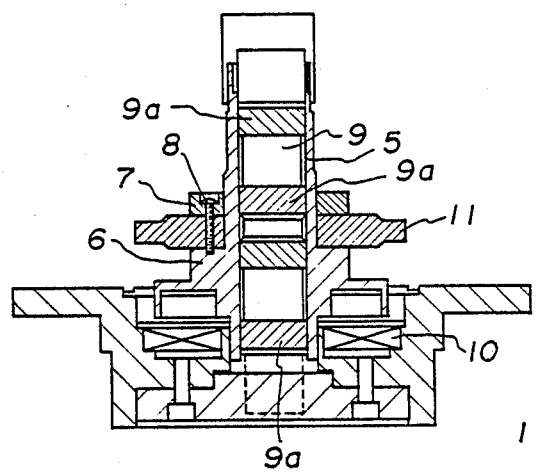
FIG. 5 is a longitudinal cross-section view of a rotational shaft of an optical deflector.

Before an embodiment of this invention is described, conventional means for fixing a polygonal mirror to a rotational shaft of a conventional optical deflector of either an air type or a magnetic bearing type will be described with reference to FIGS. 5 and 6.

A polygonal mirror 11 having a hexagonal cross-section and six reflective surfaces is fitted over a rotational shaft 5 comprising a hollow rotating body driven at high speed, and the mirror 11 is mounted on a protruding mirror mount 6 formed integrally with the shaft 5. The mirror 11 is tightened and joined to the mount 6 by means of screws 8 and a spacer 7 fitted over the shaft 5.

Figure 6:
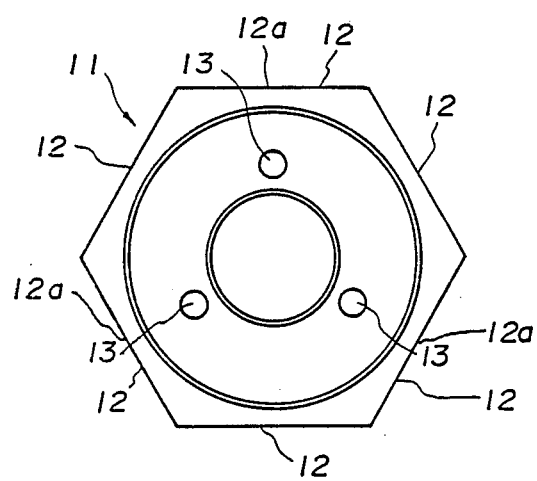
FIG. 6 is a plan view of a conventional polygon mirror.

As shown in FIG. 6, the mirror 11 has three fixing holes 13 for fixing screws 8 in the vicinity of the central portion of the mirror 11, hole 13 opposing to the midportion 12a of every other one of the respective reflective surfaces 12 of the mirror 11, so that the mirror is held and fixed between the mount 6 and spacer 7 by screws 8 turned into the holes 13. The shaft 5 receives a fixed shaft 9 in its hollow portion, at appropriate upper, middle and lower positions within which are formed herringbones, so that the herringbones and the inner peripheral surface of the shaft 5 constitute an air dynamic pressure radial bearing 9a. The shaft 5 is also supported by a magnetic thrust bearing 10 provided at an upper end of the shaft 5, so that it is borne by the non-contact type radial bearing 9a and thrust bearing 10 to allow high-speed rotation by appropriate drive means.

In such optical deflector, the centrifugal force exerted on the mirror 11 itself is not so big when the rotational speed of mirror 11 is in a low and intermediate area, i.e., in the vicinity of 17,000 rpm, so that the stress produced in the mirror 11 is low. Therefore, it is unnecessary to take care of the position of holes 13 in the mirror 11 and the shape of the mirror 11. However, in the case of a high-speed optical deflector in which the rotational speed of the mirror 11 exceeds 17,000 rpm, the centrifugal force exerted on the mirror 11 is proportional to the square of the rotational speed, so that it cannot be neglected. As a result, the stress produced in the mirror 11 increases and concentrates in the vicinity of holes 13. Thus the holes 13 are in a complicated three-axis stress state and the vicinity of the holes 13 is different in stress from other portions thereof.

Figure 7:
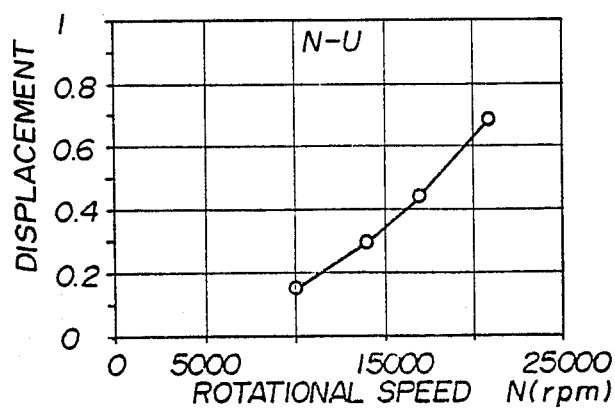
FIG. 7 is a graph showing the relationship between the number of rotations and displacement of a reflective surface of the conventional polygonal mirror.

FIG. 7 is a graph showing the relationship between displacement of the reflective surfaces and rotational speed of an aluminum-based mirror. According to this graph, when the rotational speed of the mirror arrives at about 21,000 rpm, the reflective surfaces of the mirror expand by about 0.7 um.

In the conventional mirror 11 of FIG. 6 in which the holes 13 are provided in the vicinity of the central portion of the mirror 11 at positions each opposing to the midportions 12a of every other one of the reflective surfaces 12 of the mirror 11, the reflective surfaces 12 opposing to the holes 13 become recessed, and stresses which are different from those in reflective surfaces 12 not opposing to holes 13 are produced in the recessed surfaces. The face that those stresses are different adversely affects the jitter which is the important characteristic of the scanner.

Embodiments of this invention will now be described with reference to the accompanying drawings.

The embodiments to be described below are only means for providing a clear understanding of this invention. Various changes and modification could be made by those skilled in the art without departing from the invention clearly defined in the attached claims.

Figure 1:
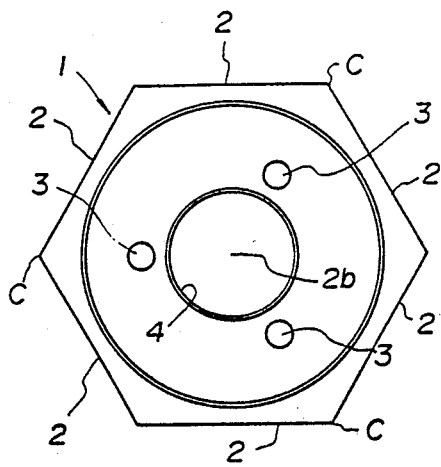
FIG. 1 is a plan view of a polygonal mirror according to one embodiment of a deflector of this invention.

In FIG. 1, polygonal mirror 1 has six aluminum-based reflective surfaces 2 and fixing holes 3, the number of which holes is half of the number of reflective surfaces 2. The holes 3 are provided at equiangular pitches such that each hole 3 opposes to every other one of the corners C of the mirror 1. The mirror 1 has a through hole 4 at its center such that the rotational shaft 5 can be inserted in the hole 4. The mirror 1 is tightened and fixed between the mount 6 and spacer 7 by screws 8 turned into the holes 3.

Since in this case, each hole 3 is at a position opposing to the corner C between the reflective surfaces 2 adjacent to each other, the strain state of the mirror 1 in an area of the high-speed rotation is the same in the reflective surfaces 2 disposed at both sides of the corner C. The corners C of the mirror 1 opposing to holes 3 are not used for optical scanning, so that even if the strain states differ in those corners C, they do not adversely affect the jitter characteristic.

Figure 2:
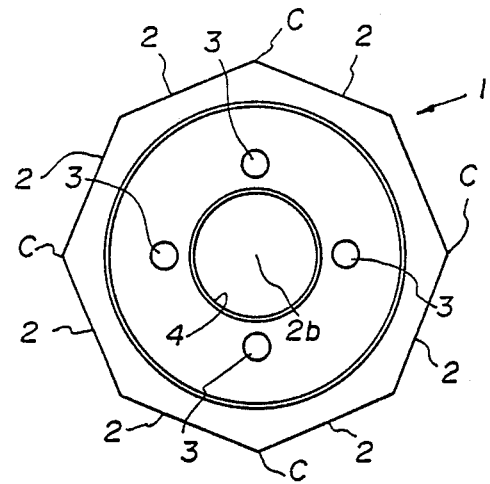
FIG. 2 is a plan view of a polygonal mirror according to another embodiment of the deflector.

In FIG. 2, the polygonal mirror 1 has eight aluminum-based reflective surfaces 2 and fixing holes 3, the number of which holes is half of the number of reflective surfaces 2. The holes 3 are provided at equiangular pitches such that each hole 3 opposes every other one of the corners C of the mirror 1. In the mirror 1 of this embodiment, the relationship between rotational speed of the mirror 1 and jitter brings about the operational effect similar to those brought about by the embodiment of FIG. 1.

Figure 3:
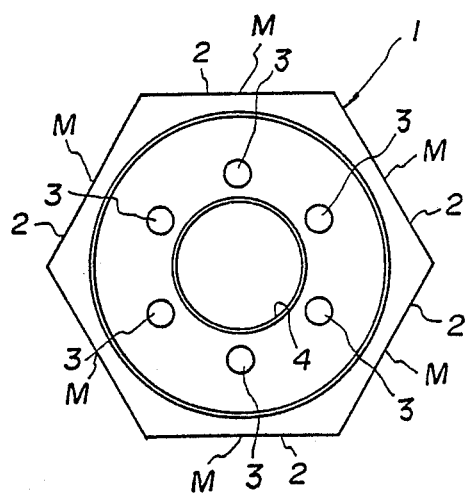
FIG. 3 is a plan view of a polygonal mirror according to still another embodiment of a deflector of this invention.

In FIG. 3, the polygonal mirror 1 has six aluminum-based reflective surfaces 2 and fixing holes 3, the number of which holes is the same as that of the reflective surfaces 2. The holes 3 are provided at equiangular pitches in the vicinity of the central portion of the mirror 1 such that they oppose to midportion M of the reflective surfaces 2. The mirror 1 has at its center a through hole 4 into which the rotational shaft 5 is inserted. The mirror 1 is tightened and fixed between the mount 6 and spacer 7 by means of screws 8 inserted into the holes 3.

Thus, the strain states in the respective reflective surfaces 2 are made uniform to improve the jitter characteristic of the optical deflector.

Figure 4:
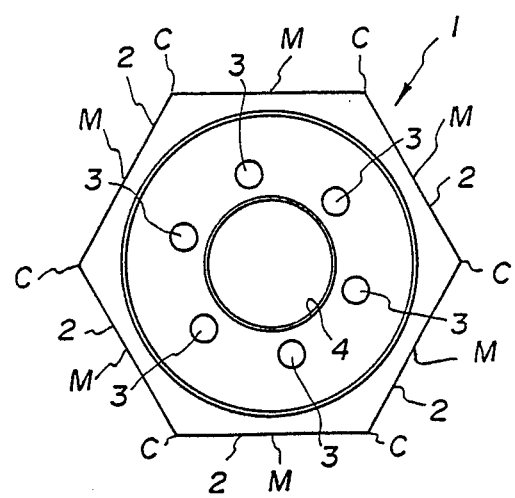
FIG. 4 is a plan view of a polygonal mirror according to still another embodiment of the a deflector of this invention.

In FIG. 4, the polygonal mirror 1 has six aluminum-based reflective surfaces 2 and fixing holes 3, the number of which holes is the same as that of reflective surfaces 2. The holes 3 are provided inside the reflective surfaces 2 and each opposes to a point between the midportion M of the reflective surface 2 and the adjacent corner C. It is unnecessary to consider the positional relationship between the holes 3 and reflective surfaces 2 except that the holes 3 are disposed at positions opposing to the midportion M of the respective surfaces 2 and at positions opposing to the corner C of the mirror 1. The embodiment of FIG. 4 also uniforms the strain states of the respective surfaces 2 and provides a good jitter characteristic of the optical deflector.

Figure 8:
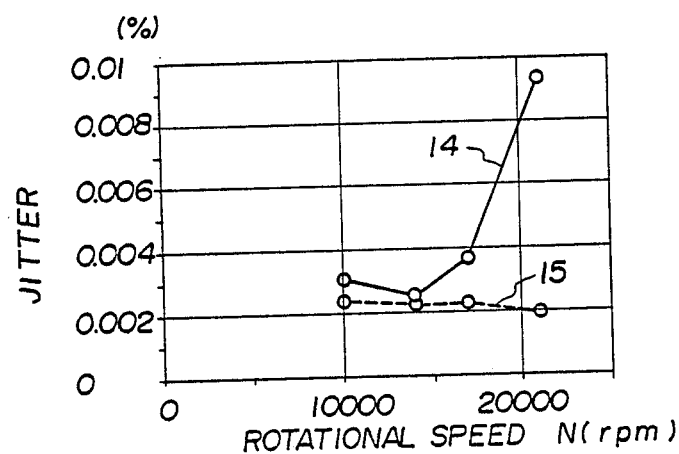
FIG. 8 is a graph illustrating an effect according to one embodiment of the deflector of this invention.

FIG. 8 shows a graph representing the jitter characteristics with respect to the rotational speed of the polygon mirror. The jitter characteristic for the conventional polygon mirror of FIG. 6, which is represented by the continuous line 14, becomes worse suddenly during over 17,000 rpm of the mirror, but the jitter characteristic for the polygon mirror of FIG. 1, exhibits satisfactory values of 0.002 % even during 21,000 rpm of the mirror.

In addition, the polygon mirror of FIG. 3 has the equivalent jitter characteristic to that of FIG. 1.

We claim:

1. An optical deflector comprising:
   a rotational shaft;

a polygonal mirror, and means for fixing said mirror to said rotational shaft at predetermined positions, said positions being equiangularly spaced with each other around a center of rotation of said mirror, said positions being identical in number with reflective surfaces of said mirror, each of said positions opposing to a corner portion of said mirror disposed between said reflective surfaces adjacent to each other, whereby the strain states of said respective reflective surfaces with respect to the high speed of rotation of said optical deflector can be uniformed and a good jitter characteristic of said optical deflector can be ensured.

2. The deflector according to claim 1, wherein said fixing means comprises screws.

3. An optical deflector comprising:

a rotational shaft;

a polygonal mirror, and means for fixing said mirror to said rotational shaft at predetermined positions, said positions being equiangularly spaced with each other around a center of rotation of said mirror, said positions being half in number of reflective surfaces of said mirror, each of said positions opposing to a corner portion of said mirror disposed between said reflective surfaces adjacent to each other, whereby the strain states of said respective reflective surfaces with respect to the high speed of rotation of said optical deflector can be uniformed and a good jitter characteristic of said optical deflector can be ensured.

4. The deflector according to claim 3, wherein said fixing means comprises screws.

5. An optical deflector comprising:

a rotational shaft;

a polygonal mirror, and means for fixing said mirror to said rotational shaft at predetermined positions, said positions being equiangularly spaced with each other round a center of rotation of said mirror, said positions being identical in number with reflective surfaces of said mirror, each of said positions opposing to a point between a corner portion of said mirror and a midportion of each of said reflective surfaces, said corner portion being disposed between said reflective surfaces adjacent to each other, whereby the strain states of said respective reflective surfaces can be uniformed and a good jitter characteristic of said optical deflector can be ensured.

6. The deflector according to claim 5, wherein said fixing means comprises screws.

* * * * *